US008381198B2

(12) United States Patent
Lennon et al.

(10) Patent No.: US 8,381,198 B2
(45) Date of Patent: Feb. 19, 2013

(54) SYSTEMS, METHODS AND COMPUTER PROGRAM PRODUCTS FOR SAFETY CHECKING EXECUTABLE APPLICATION PROGRAMS IN A MODULE

(75) Inventors: William Lennon, Cary, NC (US); Oystein Dahlsveen, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 2408 days.

(21) Appl. No.: 11/203,689

(22) Filed: Aug. 15, 2005

(65) Prior Publication Data

US 2007/0038975 A1 Feb. 15, 2007

(51) Int. Cl.
*G06F 9/44* (2006.01)
(52) U.S. Cl. ........................................ 717/136
(58) Field of Classification Search .................. 717/130, 717/131, 140; 718/1
See application file for complete search history.

(56) References Cited

U.S. PATENT DOCUMENTS

| 6,014,513 | A * | 1/2000 | Voelker et al. ................. 717/131 |
| 6,149,318 | A | 11/2000 | Chase et al. |
| 6,151,618 | A * | 11/2000 | Wahbe et al. ..................... 718/1 |
| 2003/0014737 | A1 * | 1/2003 | Smith et al. ................... 717/130 |
| 2005/0183072 | A1 * | 8/2005 | Horning et al. ............... 717/140 |

FOREIGN PATENT DOCUMENTS

| EP | 1 369 787 A2 | 12/2003 |
| WO | WO 99/10795 A1 | 3/1999 |

OTHER PUBLICATIONS

"Safety Checking of Machine Code" by Xu et al, Nov. 11, 1999, Computer Science Department of University of Wisconsin at Madison, 15 pages.*
"Compilers Principles, Techniques, and Tools" by Aho et al, Mar. 1988, Addison Wesley Longman, p. 4-5.*
"The Authoritative Dictionary of IEEE Standards Terms" by Standards Information Network, Dec. 2000, Institue of Electrical and Electronics Engineers, Inc., p. 701.*
Notification of Transmittal of the International Search Report and the Written Opinion of the International Searching Authority, or the Declaration, International Search Report, and Written Opinion of the International Searching Authority, PCT/US2006/011440, Mar. 19, 2007.
Sony Ericsson Mobile Communications AB, "Sony Ericsson GR47/GR48 Increased flexibility Simplified application development", 2003, 2 pp.
Sony Ericsson Mobile Communications AB, Sony Ericsson M2mpower package A total solution for rapid, cost-effective application development, 2003, 2 pp.

* cited by examiner

Primary Examiner — H. Sough
Assistant Examiner — Carina Yun
(74) Attorney, Agent, or Firm — Myers Bigel Sibley & Sajovec, P.A.

(57) ABSTRACT

An application program for a central processing unit of a computer module is developed. Source code for the application is written and debugged. The source code for the application program is then compiled and assembled, to provide an executable application program. The executable application program is loaded into the computer module. Safety check executable code is inserted into the executable application program that is loaded into the computer module, to prevent the executable application program from reading, writing and jumping outside a designated memory area of the computer module. The executable application program with the safety check code inserted therein is stored in the computer module.

17 Claims, 3 Drawing Sheets

SYSTEMS, METHODS AND COMPUTER PROGRAM PRODUCTS FOR SAFETY CHECKING EXECUTABLE APPLICATION PROGRAMS IN A MODULE

FIELD OF THE INVENTION

This invention relates to data processing systems, methods and computer program products, and more particularly to systems, methods and computer program products for developing and executing an application program for a central processing unit of a computer module.

BACKGROUND OF THE INVENTION

Computer modules are widely used in many consumer and industrial applications. As used herein, a computer module includes a Central Processing Unit (CPU) that is configured to execute computer programs, a memory that may include one or more classes of memory devices and that is configured to store computer programs and/or data, and one or more peripheral devices, such as input/output (I/O) devices and/or radio frequency devices, that may be used to perform desired functions of the computer module. Computer modules may exhibit a large range of physical size and/or complexity.

One example of a relatively compact computer module is the GR47/GR48 module that is marketed by Sony Ericsson Mobile Communications AB, the assignee of the present application. As described in a Preliminary Data Sheet entitled "*Sony Ericsson GR47/GR48 Increased Flexibility Simplified Application Development*", the Sony Ericsson G47/GR48 is a highly advanced radio device that comes fully-loaded with a range of GSM/GPRS voice and data features, in a compact unit (just 50×33×7.2 mm). Optimized for machine-to-machine (M2M) communications, the GR47/GR48 features an intrinsic TCP/IP protocol stack that enables a developer to make effective use of GPRS. The GR47/GR48 is configurable, to enable optimum usage of the extensive range of input/output pins provided, making it easy to adapt to a developer's M2M solution. The embedded controller is accessible for hosting applications in areas such as alarm, meter reading and vending applications.

As also noted in this Preliminary Data Sheet, the GR47/GR48 can be used as a stand-alone product or in conjunction with M2mpower Business Solution, using the M2mpower package. The M2mpower package provides a support environment that enables a developer to develop and embed an application directly onto the GR47/GR48. Embedding an application onto the GR47/GR48 allows a developer to streamline development, shorten time to market and reduce total solution costs. The M2mpower package includes developer tools, documentation, training and support. The M2mpower package is described in a brochure entitled "*Sony Ericsson M2mpower Package A Total Solution For Rapid, Cost-Effective Application Development*".

The M2mpower package described above is an example of a customized Integrated Development Environment (IDE) for a computer module that allows third party developers to develop applications that may be run on the computer module. Customized integrated development environments, such as the M2mpower package, may be provided for a given computer module. Unfortunately, it may be costly to develop and maintain a customized integrated development environment. Moreover, storage space for programs may be limited in a computer module. It therefore it may be desirable to provide an integrated development environment that can reduce or minimize storage on the module that is used by an integrated development environment.

SUMMARY OF THE INVENTION

Exemplary embodiments of the present invention provide methods for developing an application program for a central processing unit of a computer module. Source code for the application is written and debugged. The source code for the application program is then compiled and assembled, to provide an executable application program. The executable application program is loaded into the computer module. Safety check executable code is inserted into the executable application program that is loaded into the computer module, to control reading, writing and/or jumping outside a designated memory area of the computer module by the executable application program. In some embodiments, the safety check executable code prevents the executable application program from reading, writing and/or jumping outside the designated memory area of the computer module. The executable application program with the safety check code inserted therein is stored in the computer module.

In some embodiments, when compiling and assembling, the source code is linked to a map of intrinsic functions of the computer module that are available to the application program. Moreover, in some embodiments, when inserting the safety check executable code, the executable application program, with the safety check code inserted therein, may be relinked. Also, in some embodiments, after storing the executable application program with the safety check executable code inserted therein, the executable application program with the safety check code inserted therein may be executed on a central processing unit of the computer module.

In some embodiments, inserting the safety check executable code may be performed by providing a machine code make-safe tool in the computer module, wherein the machine code make-safe tool is configured to insert the safety check executable code into a program that is loaded into the computer module. The machine code make-safe tool processes the executable application program that is loaded into the computer module, to insert the safety check executable code into the executable application program that is loaded into the computer module.

In some embodiments, the computer module may include volatile memory and nonvolatile memory. The safety check executable code can control and/or prevent the executable application from reading and/or writing outside a designated memory area of the volatile memory, and/or jumping outside a designated area of the nonvolatile memory. Moreover, in some embodiments, the computer module can include a radio frequency section that is controlled by the central processing unit, and the application program may be configured to provide functionality for the radio frequency section.

Other embodiments of the present invention allow a machine code application program to be executed directly on a central processing unit of a computer module by read, write and/or jump checking the machine code application program as it executes directly on the central processing unit, to control reading, writing and/or jumping outside a designated memory area of the computer module by the machine code application program. Prior to performing the read, write and/or jump checking during execution, the safety check executable code may be inserted into the executable application program according to any of the embodiments that were described above.

It will be understood by those having skill in the art that embodiments of the present invention have been described above in connection with methods of developing an application program and/or executing an application program. However, analogous systems, such as integrated development environments, and analogous computer program products also may be provided according to various embodiments of the present invention.

Computer modules according to some embodiments of the present invention include a central processing unit, a memory that is configured to store programs that execute on the central processing unit, and a machine code application program in the memory that is configured to execute directly on the central processing unit. These embodiments may also include a machine code make-safe tool in the memory that is configured to execute directly on the central processing unit, and to control and/or prevent the machine code application program from reading, writing and/or jumping outside a designated area of the memory.

Computer modules according to other embodiments of the present invention may include a machine code make-safe tool in the memory that is configured to execute directly on the central processing unit and to insert safety check executable code into an application program, to control and/or prevent the application program from reading, writing and/or jumping outside a designated memory area of the computer module. At least one application program in the memory is configured to execute directly on the central processing unit, and contains therein the safety check executable code. Analogous methods and computer program products also may be provided.

DETAILED DESCRIPTION

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flowcharts of methods, systems and computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Figure 1:
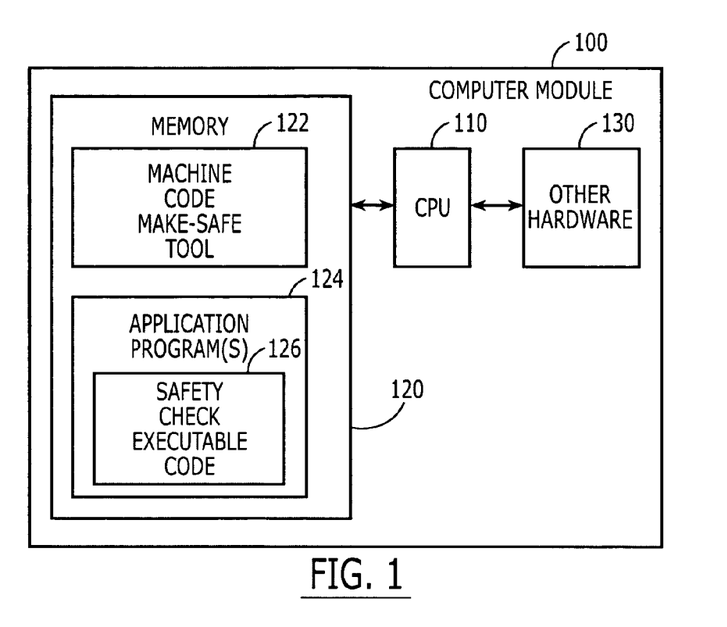
FIG. 1 is a block diagram of a computer module according to exemplary embodiments of the present invention.

FIG. 1 is a block diagram of a computer module according to exemplary embodiments of the present invention. As shown in FIG. 1, a computer module 100 includes a central processing unit (CPU) 110 and a memory 120 that is configured to store programs that execute on the CPU 110. The memory 120 may be a single type of memory device, or may be representative of a hierarchy of memory devices including volatile, nonvolatile, solid state, magnetic and/or optical memory devices.

One or more machine code application program(s) 124 reside in the memory 120. The machine code application program(s) 124 are configured to execute directly on the CPU 110. A machine code make-safe tool 122 also resides in the memory 120, and is configured to execute directly on the CPU 110 and to control reading, writing and/or jumping outside a designated area of the memory 120 by the machine code application program(s) 124. It will be understood that the designated area may be a contiguous area of memory and/or multiple noncontiguous areas. In some embodiments, the machine code make-safe tool 122 is configured to insert safety check executable code into the application program(s) 124, to prevent the executable application program(s) 124 from reading, writing and/or jumping outside the designated memory area of the computer module. In these embodiments, the application program(s) 124 may contain the safety check executable code 126 therein.

Still referring to FIG. 1, other hardware 130 also may be included in the module 100 to provide, for example, a man-machine interface, a machine-to-machine (M2M) interface, a radio frequency (RF) section and/or other conventional hardware components. In some embodiments, the application program(s) 124 are configured to provide and/or supplement the functionality of the other hardware 130.

Some embodiments of the invention may allow conventional compilers and assemblers to be used to generate an application program, but can reduce or prevent the application program from interfering with operations of the computer module by inserting the safety check executable code into the executable application program. Moreover, by allowing an executable application program to be loaded into the computer module, the space that is taken up by an integrated development environment on the computer module can be reduced or minimized.

Moreover, some embodiments of the invention may allow third parties to provide application programs for embedded computer modules. In particular, some embodiments of the invention allow third party users to generate an application program, which runs on an embedded computer module without creating undue security concerns. On a conventional personal computer with an open operating system, it may be up to the user to ensure that the application program does not create a security concern or cause the personal computer to crash. In contrast, in an embedded module, the module provider may need to ensure that the module continues to function properly regardless of the application program(s) that a third party developer loads on the module.

Figure 2:
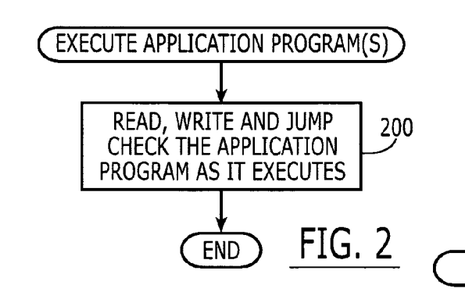
FIG. 2 is a flowchart of operations that may be performed to execute application program(s) according to exemplary embodiments of the present invention.

FIG. 2 is a flowchart of operations that may be performed to execute one or more application programs in a computer module according to exemplary embodiments of the present invention. These operations may be performed by the machine code make-safe tool 122 and/or the safety check executable code 126 with respect to the application programs 124 of FIG. 1.

In particular, as shown in FIG. 2 at Block 200, a machine code application program 124 may be executed directly on a CPU 110 of a computer module 100 by read, write and/or jump checking the machine code application program 124 as it executes directly on the CPU 110, to control reading, writing and/or jumping outside a designated memory area of the computer module 110 by the machine code application program 124. In some embodiments, the reading, writing and/or jumping outside the designated area may be prevented.

Figure 3:
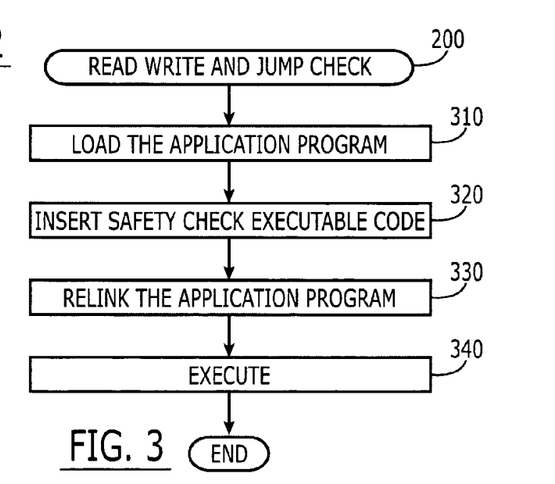
FIG. 3 is a flowchart of operations that may be performed to read, write and jump check an application program as it executes, according to exemplary embodiments of the present invention.

FIG. 3 is a flowchart of operations that may be performed to read, write and/or jump check according to various embodiments of the present invention, which may correspond to Block 200 of FIG. 2. In particular, as shown in FIG. 3, one or more machine code application programs 124 are loaded into the computer module 100, at Block 310. It will be understood that the loading of the machine code application program(s) 124 may take place in its entirety before subsequent operations begin, may take place in sections before subsequent operations begin and/or may be performed line by line in conjunction with subsequent operations.

Referring to Block 320, safety check executable code, such as safety check executable code 126 of FIG. 1, is inserted into the application program 124 that is at least partially loaded into the computer module 100 at Block 310, to control and/or prevent the application program from reading, writing and/or jumping outside a designated memory area of the computer module 100. In some embodiments of the invention, the computer module 100 may include volatile memory such as random access memory (RAM) and nonvolatile memory such as flash memory. The safety check executable code 126 may control and/or prevent the executable application program 124 from reading and/or writing outside a designated area(s) of the RAM, and/or from jumping outside a designated area(s) of the flash memory.

Still referring to FIG. 3, at Block 330, it may be desirable to relink the application program 124 due to the added safety check executable code 126 that was inserted therein at Block 320. Finally, at Block 340, the application program 124 with the safety check executable code 126 inserted therein is executed on the CPU. Execution may be performed during development and/or during actual field use.

Figure 4:
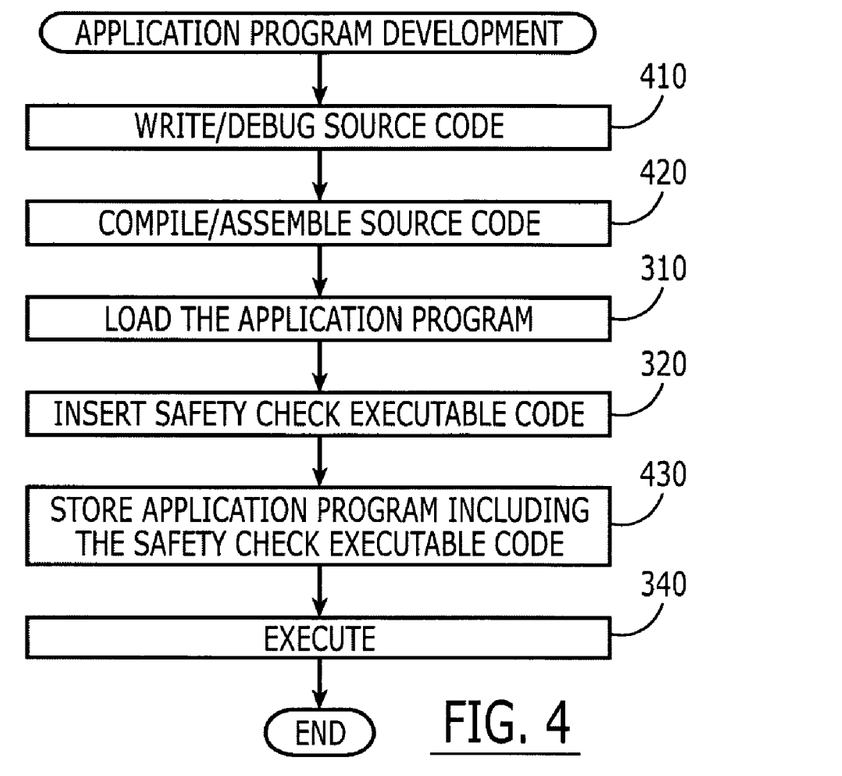
FIG. 4 is a flowchart of operations that may be performed for application development according to exemplary embodiments of the present invention.

FIG. 4 is a flowchart of operations that may be performed to develop an application program for a central processing unit of a computer module, such as the application program 124 for the central processing unit 110 of the computer module 100 of FIG. 1, according to some embodiments of the invention. These operations may provide an integrated development environment according to some embodiments of the present invention. As shown in FIG. 4 at Block 410, source code for the application program is written and debugged. In some embodiments, a conventional source code language, such as C, may be used along with conventional source code authoring and debugging tools. Proprietary and/or customized source code languages and/or tools need not be used. It will also be understood by those having skill in the art that source code languages other than C may be used. These source code languages should include a compiler that can convert the source code into native machine instructions that can execute on the central processing unit 110. Thus, for example, Basic, Java, ADA, Pascal, assembly language, etc., may be used, in some embodiments.

Then, at Block 420, the source code is compiled and assembled, to provide an executable application program. In some embodiments, a conventional compiler/assembler, such as the freeware GNU Compiler Collection (GCC), may be used. Customized compilers and/or assemblers need not be provided or maintained. At Block 310, the executable application program is then loaded into the computer module, as was already described in connection with FIG. 3, and the safety check executable code is inserted into the executable application program at Block 320, as was already described in connection with FIG. 3. Then at Block 430, the executable application program with the safety check code inserted therein is stored in the module. Finally, at Block 340, the application program including the safety check code is then executed in a development environment and/or in an operational environment, as was described above in connection with FIG. 3.

Figure 5:
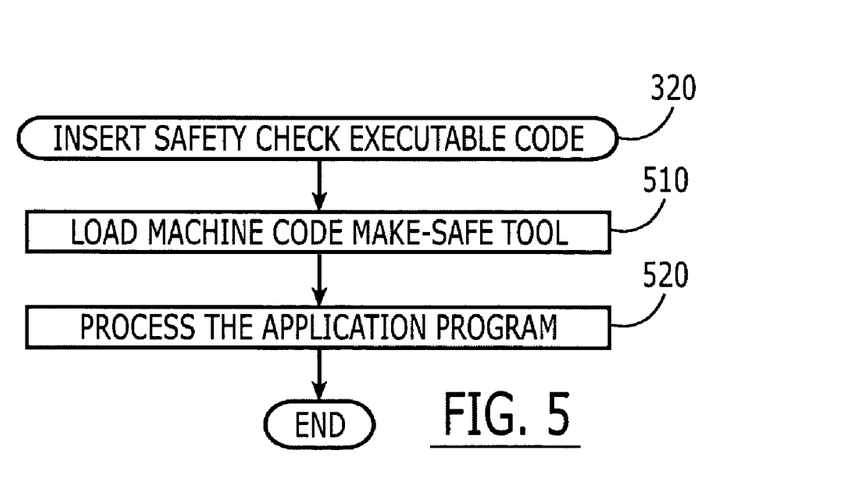
FIG. 5 is a flowchart of operations that may be performed to insert safety check executable code according to exemplary embodiments of the present invention.

FIG. 5 is a flowchart of operations that may be performed to insert safety check executable code, which may correspond to Block 320 of FIGS. 3 and/or 4. As shown in FIG. 5, a machine code make-safe tool, such as the machine code make-safe tool 122 of FIG. 1, is loaded into the computer module 100 at Block 510. The machine code make-safe tool is configured to insert the safety check executable code into a program that is loaded into the computer module. Then, at Block 520, the executable application program that is loaded into the computer module is processed by the machine code make-safe tool, to thereby insert the safety check executable code, such as the safety check executable code 126, into the machine code application program 124 that is loaded into the computer module 100.

Additional discussion of the operations of FIGS. 3-5 now will be provided. In particular, referring again to Block 420, during compiling and assembly, the source code may be linked to a map of intrinsic functions of the computer module 100 that are available to the application program. An example of a map file that contains intrinsic functions that would be available to a developer is illustrated in Table 1. The map file allows the developer's application program to link successfully, by telling the linker where to jump when the application calls a given function. As shown by Table 1, functions for printing, sending, dialing, answering, hang-up, short message services (SMS) and/or pin activation can be provided, in some embodiments.

TABLE 1

| intrinsic_function_map | |
|---|---|
| *(.text) | |
| .text | |
| 0x02000000 | __m2m__printf |
| 0x02000004 | __m2m__sendAT |
| 0x02000008 | __m2m__dial |
| 0x0200000c | __m2m__answer |
| 0x02000010 | __m2m__hangup |
| 0x02000014 | __m2m__sms__send |
| 0x02000018 | __m2m__sms__read |
| 0x0200001c | __m2m__sms__delete |
| 0x02000020 | __m2m__pin1 |
| 0x02000024 | __m2m__pin2 |
| 0x02000028 | __m2m__pin3 |
| 0x0200002C | __m2m__pin4 |

Moreover, at Block 320, when the safety check executable code is inserted, the executable program with the safety check code inserted may be relinked to compensate for the added safety check code that was inserted.

Additional discussion of various embodiments of the present invention now will be provided. In particular, many users of a computer module, such as the Sony Ericsson GR47/GR48 described above, may not have the resources to design and build their own module/controller hardware. Accordingly, a module, such as the GR47/GR48, may allow developers to write one or more embedded applications that run directly on the module, so that a separate hardware controller may not need to be used. Unfortunately, the embedded application may run as an interpreted language, which may produce relatively slow execution. The embedded application also may be uploaded into the module as text source code, which may consume excessive memory or may place an added burden on the developer to right terse source code that does not include, for example, comments. The source code may also be written in a custom language, which may be, for example, "C-like", but which may lack the richness of true C and which may need to be maintained. Finally, a customized integrated development environment may need to be designed and maintained.

Commercial alternatives, such as Java, may not be practical, because even if a Java virtual machine is reduced to a small size, it still may consume excessive resources in the memory of the module. Moreover, conversion to a commercial alternative like Java may be undesirable for existing developers who are already coding in a proprietary "C-like" language.

Some embodiments of the present invention can allow conventional editors, assemblers and compilers to be used with conventional languages, to compile a machine code application that can be loaded directly on the module. A make-safe tool according to some embodiments of the invention can provide security for the loaded application programs.

Figure 6:
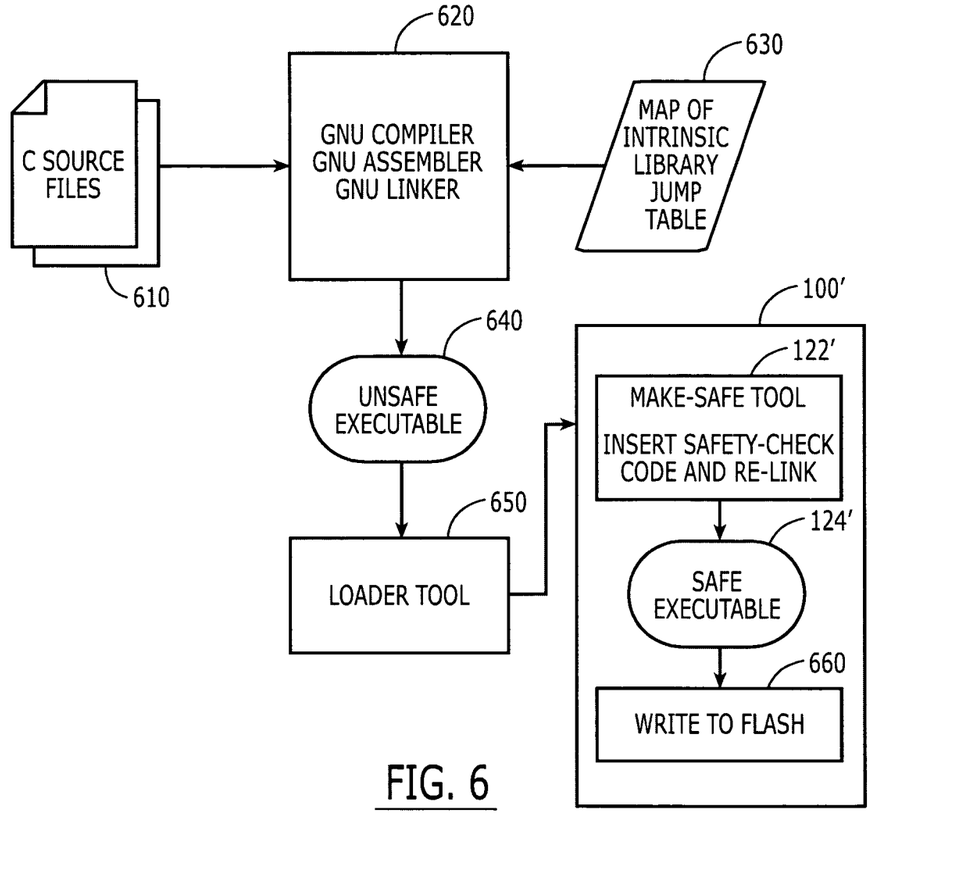
FIG. 6 is a functional block diagram of an application program development environment according to exemplary embodiments of the present invention.

FIG. 6 functionally illustrates an application program development environment according to various embodiments of the present invention. A developer writes a C code source file 610 using a conventional C editor. A map of an intrinsic library jump table 630 may be provided, as was described above in connection with Table 1. The intrinsic library jump table 630 can allow the developer to compile code using a conventional integrated development environment, such as the GNU compiler, GNU assembler and GNU linker 620, and step through the code on a local host to debug the code. The full power of the commercial integrated development environment may be available to the developer. The characteristics of the computer module need not dictate to the developer which integrated development environment to use, and customized integrated development environments need not be maintained or supported.

To compile, the developer may run the GNU compiler 620 to produce a compiled executable. The compiler 620 may contain the GNU freeware compiler, assembler and linker, a linker map file that links to the intrinsic function jump table 630 and configuration information that is used by the compiler to generate the compiled executable code. The map file 630 may contain the memory address of the static flash jump-table that represents the intrinsic library functions. The user may not have knowledge of other function calls not provided in the map 630, so that the user may not have the ability to link to other function calls.

As a result of the operations of the compiler 620, an executable is produced. However, this executable is potentially an unsafe executable 640, because it may read, write and/or jump outside a designated memory area and may thereby corrupt other operations of the module.

A loader tool 650 is then used to upload an image of the unsafe executable 640 onto the module 100'. As was described above in connection with Block 310, the image may be loaded in its entirety, by section and/or by line. The module 100' then runs the make-safe tool 122' to make the executable safe to run as native code, and thereby produce a safe executable 124', which may correspond to the application programs 124 with the safety check executable code 126 of FIG. 1 therein. The safe executable 124' may be stored in a flash memory as shown at Block 660.

Additional discussion of machine code make-safe tools 122, 122' according to some embodiments of the present invention, will now be provided. In particular, it may be desirable to ensure that any embedded application is secure, meaning it cannot escape its resource "sandbox". The embedded application may be provided a dedicated section of flash memory, where the embedded application will reside. The embedded application will execute from this flash memory location. The embedded application may also be provided a dedicated section of RAM, which may be used for program variables. The embedded application also may be provided a dedicated task, and the register stack for that task may also reside in this RAM space.

In some embodiments of the invention, the make-safe tool 122, 122' takes the developer's unsafe machine code executable 640 and inserts calls to read-check, write-check and branch-check routines. All read, store and branch instructions may thereby be modified to ensure that they run in the allotted space. For example, it may be ensured that all store (write) instructions point to memory in the allocated RAM space. Moreover, it can be verified that all branch and jump instructions point to memory in the flash space.

An example of potentially unsafe executable code 640 and how the machine code make-safe tool 122/122' can prevent the unsafe code from operating, according to various embodiments of the present invention, now will be provided. An example of the unsafe store or write instructions will be described. However, similar examples may apply to read and jump instructions. The following example shall be regarded as merely illustrative and shall not be construed as limiting the invention.

In particular, the following C code may be considered unsafe, because it can potentially corrupt outside memory:

```
char* ptr = 0x00080000;      // Point to the edge of EA space
* (ptr + 0x10000) = 0xBB;    // Corrupt outside memory.
```

This C code may be contained in the C source files 610 of FIG. 6. The compiler/assembler/linker 620 may compile the source code into the following assembly code:

```
LDR r0, 0xBB              // load r0 with the value to write
LDR r2, 0x00080000        // R2 points to the edge of memory space
STR r0, [r2 + #10000]     // store to the address of r2 + 10000.
```

In some embodiments, the make-safe tool 122/122' would replace the above STR (store) instruction with:

```
LDR r0, 0xBB              // load r0 with the value to write
LDR r12, [r2 + #10000]    // Put the address [r2 + #10000] into r12
BR  write_check           // call the write-check function
STR r0, r12               // if function returns, write to address,
``` where the write_check function may be as follows:

```
CMP r12, write_ea_start
BLE  write_exception      // if r12 is below valid range, abort
CMP r12 , write_ea_end
BGE write_exception       // if r12 is above valid range, abort.
```

As can be seen, the write_check function compares the write address to a valid start write address and a valid end write address, and creates an exception if the write address is out of range. Thus, if the write_check subroutine detects an out of range pointer, the application task may be suspended, and/or an error message may be reported. Similar functions may be provided for read and jump instructions. It will be understood that the embedded application may operate slightly slower due to the safety checks, but the speed may still be much faster than if an interpreter is used.

As was described generally in connection with Block 330, the make-safe tool 122, 122' can operate on a binary executable, so that, as it inserts safety check code, it may also need to modify branch and jump instructions to reflect the target's new memory address. This relinking may be achieved by creating a table that contains the original code addresses and the new offsets. Relinking can then perform the offset arithmetic to each branch instruction as it reaches them. For example, the branch offset table of Table 2 may be provided:

TABLE 2

| Original Address | Offset |
|---|---|
| 0x00080000 | 0x00 |
| 0x00080010 | 0x08 |
| 0x00080024 | 0x10 |
| 0x00080030 | 0x18 |

When the make-safe tool 122, 122' encounters this line:

BR 0x00080018.

the tool would look up in Table 2 and determine that all code from address 0x00080010 to 0x00080024 has been moved 8 bytes. Thus, the branch instruction may be replaced with:

BR 0x00080020.

At run time, the module 100, 100' may perform C language start up processes, which may include zeroing out all RAM, copying all static and constant variables to their correct RAM address, and initializing stack and heap pointers. The module 100, 100' may then start the dedicated, low priority, embedded application task, point it at the embedded application main function and allow the embedded application to execute. A second task can monitor the embedded application task, checking for sufficient stack space and other potential problems. Problems may be reported to the user.

Some embodiments of the present invention can allow applications to be larger, because applications can be stored on the module as machine code, which generally is more compact than interpreted source code. Thus, the application may be larger and still fit in the allotted memory space. Moreover, the application may run as native code and, therefore, may run faster than scripts that use interpreting. The developer also may produce more powerful applications, because the developer may have access to the complete C and/or other language, and/or may have access to commercial integrated development environments. Code writing also may be made easier because the code writing features of commercial integrated device environments may be used. Moreover, customized languages and integrated development activities may need not be supported by the marketer of the module.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A computer-implemented method of developing an application program for a central processing unit of a computer module comprising:
loading a compiled and assembled executable application program into the computer module;
inserting safety check executable code into the executable application program that is loaded into the computer module to control reading, writing and/or jumping by the executable application program outside a designated memory area of the computer module; and
storing the executable application program with the safety check code inserted therein in the computer module.

2. A method according to claim 1 wherein loading a compiled and assembled executed application program into the computer module is preceded by:
writing and debugging source code for the application program; and
compiling and assembling the source code for the application program to provide the compiled and assembled executable application program.

3. A method according to claim 2 wherein compiling and assembling further comprises linking the source code to a map of intrinsic functions of the computer module that are available to the application program.

4. A method according to claim 3 wherein inserting safety check executable code further comprises relinking the executable application program with the safety check code inserted therein.

5. A method according to claim 1 wherein the following is performed after storing the executable application program with the safety check executable code inserted therein:
executing the executable application program with the safety check code inserted therein on the central processing unit.

6. A method according to claim 1 wherein inserting safety check executable code comprises inserting safety check executable code into the executable application program that is loaded into the computer module to prevent the executable application program from reading, writing and/or jumping outside the designated memory area of the computer module.

7. A method according to claim 1 wherein inserting safety check executable code comprises:
providing a machine code make-safe tool in the computer module, the machine code make-safe tool being configured to insert the safety check executable code into a program that is loaded into the computer module; and
processing the executable application program that is loaded into the computer module using the machine code make-safe tool to insert the safety check executable code into the executable application program that is loaded into the computer module.

8. A method according to claim 1 wherein the computer module includes volatile memory and nonvolatile memory and wherein inserting safety check executable code comprises inserting safety check executable code into the executable application program that is loaded into the computer module to control reading and/or writing outside a designated memory area of the volatile memory and/or jumping outside a designated memory area of the nonvolatile memory by the executable application program.

9. A method according to claim 1 wherein the computer module includes a radio frequency section that is controlled by the central processing unit and wherein the executable application program is configured to provide functionality for the radio frequency section.

10. A computer-implemented method of executing a machine code application program directly on a central processing unit of a computer module comprising:
read, write and/or jump checking the machine code application program as it executes directly on the central processing unit to control reading, writing and/or jumping by the machine code application program outside a designated memory area of the computer module,
wherein the computer module includes a radio frequency section that is controlled by the central processing unit and wherein the machine code program is configured to provide functionality for the radio frequency section.

11. A method according to claim 10 wherein read, write and/or jump checking is preceded by loading the machine code application program on the computer module and wherein read, write and/or jump checking comprises inserting safety check executable code into the machine code application program that is loaded into the computer module to control reading, writing and/or jumping by the machine code application program outside a designated memory area of the computer module.

12. A method according to claim 11 wherein inserting safety check executable code further comprises relinking the machine code application program with the safety check code inserted therein.

13. A method according to claim 10 wherein the computer module includes volatile memory and nonvolatile memory and wherein read, write and/or jump checking comprises read, write and/or jump checking the machine code application program as it executes directly on the central processing unit to control reading and/or writing outside a designated memory area of the volatile memory and/or jumping outside a designated memory area of the nonvolatile memory by the executable application program.

14. A computer module comprising:
a central processing unit;
a memory that is configured to store programs that execute on the central processing unit;
a machine code application program in the memory that is configured to execute directly on the central processing unit;
a machine code make-safe tool in the memory that is configured to execute directly on the central processing unit and to control reading, writing and/or jumping outside a designated area of the memory by the machine code application program; and
a radio frequency section that is controlled by the central processing unit and wherein the application program is configured to provide functionality for the radio frequency section.

15. A computer module according to claim 14 wherein the memory includes volatile memory and nonvolatile memory and wherein the machine code make-safe tool is configured to insert safety check executable code into the machine code application program to control reading and/or writing outside a designated memory area of the volatile memory and/or jumping outside a designated memory area of the nonvolatile memory by the executable application program.

16. A computer module comprising:
a central processing unit;
a memory that is configured to store programs that execute on the central processing unit;
a machine code make-safe tool in the memory that is configured to execute directly on the central processing unit and to insert safety check executable code into an application program to control reading, writing and/or jumping outside a designated memory area of the computer module by the application program;

at least one application program in the memory that is configured to execute directly on the central processing unit and that contains the safety check executable code therein; and a radio frequency section that is controlled by the central processing unit and wherein the application program is configured to provide functionality for the radio frequency section.

17. A computer module according to claim 16 wherein the memory includes volatile memory and nonvolatile memory and wherein the machine code make-safe tool is configured to insert safety check executable code into the application program to control reading and/or writing outside a designated memory area of the volatile memory and/or jumping outside a designated memory area of the nonvolatile memory by the executable application program.

* * * * *